Aug. 7, 1962     G. O. SHECTER ET AL     3,047,888

CUSHIONING STRUCTURE

Original Filed May 2, 1958

IRWIN L. HIRSCH
George O. Shecter,
INVENTORS

BY.

Bernard Kriegel

ATTORNEY.

3,047,888
CUSHIONING STRUCTURE

George O. Shecter, 621 N. Elm Drive, Beverly Hills, Calif., and Irwin L. Hirsch, 6850 N. Teesdale, North Hollywood, Calif.
Continuation of application Ser. No. 732,620, May 2, 1958. This application Dec. 5, 1960, Ser. No. 73,948
9 Claims. (Cl. 5—361)

The present invention relates to cushioning materials and products made therefrom. It relates more particularly to composite or laminated cushioning structures formed from cellular resilient materials, such structures including mattresses, pads, furniture cushions, or the like.

This application is a continuation of application Serial No. 732,620 filed May 2, 1958, now abandoned.

Mattresses and other cushioning products formed of cellular resilient materials, such as foam rubber, are now in general use. Such mattresses are generally formed by molding and curing foam rubber in the size and shape desired to obtain flexible, resilient products having a cellular structure. Foam rubber, if properly formulated and cured, possesses a high degree of resilience and a rapid rate of recovery when released from compression forces, with the result that mattresses and other cushioning products possess a high degree of "bounce." This property is disadvantageous in a mattress, since the frequent body movements during rest or slumber encounter a certain degree of resistance or "fight back" from the material of which the mattress is formed, thus preventing maximum comfort. Other types of resilient cellular materials have been utilized for mattresses and other cushioning structures in general, including the more recently developed urethane foams. However, such materials as utilized also possess high resilience and rapid rate of recovery comparable to that of foam rubber. In addition, conventional cellular materials as used in mattresses and analogous structures possess the disadvantage that their inherent ability to absorb stresses and shocks is not entirely satisfactory, since it has been found that high resilience, low hysteresis foams, such as conventional foam rubber and other conventional foams, have relatively poor impact and shock-absorbing qualities.

Applicants have discovered that a highly satisfactory mattress and cushioning construction is one which will have high load carrying characteristics, will be self-adjusting to the load imposed, and yet combine the functions of resilience, shock and impact absorption, and reduced rate of recovery, so as to provide maximum comfort during use.

In accordance with applicants' discovery, such construction is obtained by combining conventional high recovery rate foams, such as foam rubber or urethane foams, with a predetermined proportion of a high hysteresis foam having a low rate of recovery, preferably in the form of a laminated structure. These results are achieved by assembling superimposed layers including the two types of foam in a suitable manner to obtain the desired results, which may be varied over a wide range by selection of varying types and thicknesses of foam. In a preferred modification of the invention as applied to a mattress construction, a layer of high hysteresis, slow recovery rate foam is assembled between two layers of low hysteresis foam having a high recovery rate, with the result that the advantageous characteristics of both types of foam are utilized while the disadvantages inherent in the use of each type alone are minimized. The disadvantages of conventional foams are discussed above, while in the case of high hysteresis foams when utilized alone, these have been found to have poor load carrying capacity and a tendency to "bottom," with the result that the body would tend to sink into the cushion or mattress.

It is, therefore, an object of the present invention to produce a cushioning construction having excellent load carrying capacity, as well as desirable cushioning characteristics providing a high degree of comfort.

It is a further object of the present invention to provide a mattress construction in which the load during use is transferred both vertically and laterally throughout the body of material, and wherein a controlled rate of recovery is obtained through the use of different materials having differing load carrying and shock absorbing charactertistics.

Other objects and advantages of the invention will be apparent from consideration of the accompanying drawings and the description thereof which follow.

Figure 1:
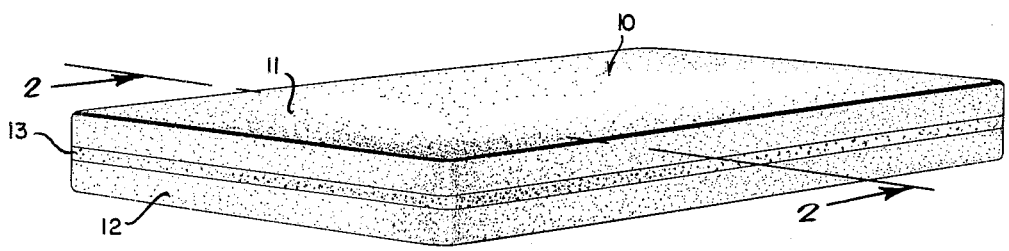
FIGURE 1 is a view in elevation of a cushioning construction, such as a mattress embodying the invention.
Figure 2:
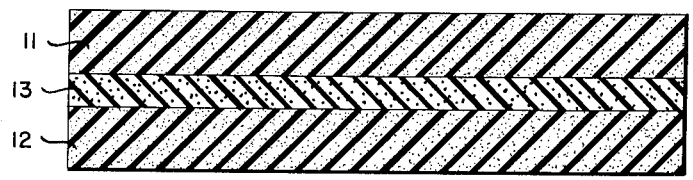
FIG. 2 is a transverse cross sectional view taken along lines 2—2 of FIG. 1.

As illustrated in FIGS. 1 and 2, a mattress 10 is formed of layers 11 and 12 of resilient foam, such as foam rubber or urethane foam of the polyester or polyether type. Between these two layers is positioned layer 13 of a high hysteresis, low recovery rate foam preferably of the urethane type, and which is further described below. Standard foam mattresses are generally made with a thickness of approximately four inches in standard widths. Certain deluxe types of mattresses are made in six inch thickness. The relative thickness of each layer in a mattress construction of the type illustrated is, to a certain extent, a matter of choice and degree, and will depend upon the type of load carrying and cushioning characteristics desired. A preferred construction utilizes top and bottom layers of conventional foam having a thickness of two inches and an intermediate layer of the high hysteresis foam having a thickness of about ¾-inch, and such thickness may be considered to be only exemplary of the type of construction. In the manufacture of the cushioning product of the invention, one or more layers of high resiliency foam of the conventional type may be assembled or laminated with one or more layers of the low resiliency foam described herein. Foam of the conventional type, having a relatively rapid rate of recovery or low hysteresis, may be foam rubber of the type produced by the Dunlop or Talalay processes, as represented by U.S. Patents Nos. 1,852,447 or 2,432,353, respectively, or may be of the urethane type as described in U.S. Patent No. 2,764,565 or 2,785,739.

More recently, resilient urethane foams have been made by utilizing polyethers in place of all or part of the polyester resin. For example, such a foam may be made by reacting a polyether, such as polypropylene ether glycol with toluene diisocyanate in the proportion of one molecular weight of polyether with two molecular weights of the diisocyanate to form a prepolymer. This prepolymer standardized to about 9 to 10% —NCO by the addition of more diisocyanate, the NCO groups serving to generate the foam by subsequent reaction with water. The polyether is preferably selected to have a molecular weight in the range of about 500 to 2,000. The prepolymer is reacted with about 2 to 5% by weight of water in the presence of about 1% of an organic amine catalyst, such as N-methylmorpholine. Resilient foams having a density of about 2 to 6 pounds per cubic foot are obtained.

The term "hysteresis" as used herein is commonly utilized to describe certain characteristics of resilient materials, such as rubber or plastics, and represents the internal friction which results in such materials when flexed or otherwise stressed. Such internal friction causes internal heat to build up within these materials, so that hysteresis can be measured by the changes in temperature which occur in a sample of rubber or plastic under stressed conditions. Resilience is a function of hysteresis, so that materials having a high hysteresis have a low resilience which, in turn, means a low rate of recovery from loading or stress. On the other hand, materials having a low hysteresis have a high degree of resilience or rate of recovery. As indicated above, conventional foam rubber and urethane foams as produced by the methods referred to have a relatively rapid recovery rate and low hysteresis.

The slow recovery material, which is used in the present invention in association with the rapid recovery material, is made, for example, by modifying conventional urethane polymers by the incorporation of castor oil as a modifying or plasticizing agent. One such material may be made by heating 1,800 grams of castor oil with 1,300 grams of toluene diisocyanate for one hour at 135° C. One hundred grams of the resulting prepolymer are then further plasticized with 30 grams of castor oil and mixed with a foaming mixture of 1.5 grams of water, 0.75 gram of a sulfonated vegetable oil emulsifier, and 10 grams of a catalyst, such as tetrahydroxy ethyl ethylenediamine. The resiliency of this type of foam was about 5% by the falling ball method.

Another type of high hysteresis foam may be made by reacting 100 grams of a polypropylene ether glycol having an average molecular weight of about 1,000 with 100 grams of castor oil and 66 grams of toluene diisocyanate. The ingredients are mixed and allowed to react with the evolution of heat and then maintained at 100° C. for two and one-half hours. At this point 46 grams of additional toluene diisocyanate are added and the mixture adjusted to from 10 to 12% of —NCO. One hundred grams of the resulting prepolymer are then reacted with about 2.5 grams of water and 1 gram of N-methylmorpholine as a catalyst and allowed to foam. The resiliency of this type of foam was about 20% by the Yerzley method. A product having a still lower resiliency may be obtained by substituting a polyester resin for all or part of the glycol.

In general, conventional low hysteresis cellular materials such as foam rubber and urethane foams have a relatively high degree of resilience. For example, foam rubber will generally have a resilience of about 50% to 75% when determined by the Yerzley or falling ball methods. By the same token polyether urethane foams of this type will have a resilience ranging from about 40% to 70%, and polyester urethane foams will have a resilience ranging from 30% to 50% when determined by these methods.

The Yerzley method is described in Rubber Chem. & Tech., volume 13 (1940), pages 149-158, and has been adopted as A.S.T.M. method D945-52T. The "falling ball" method as referred to herein measures the height of rebound of a freely falling steel ball 0.5" in diameter and weighing 8.5 grams dropped from a height of 10" to the surface of a piece of foam at least one inch thick.

Applicants have utilized a method for determining resilience by measuring the rate of return of such material after being compressed a predetermined amount. In this method a 4" cube of the foam is compressed to 25% of its thickness by application of a five pound weight and the percentage of recovery in the first second after removal of the weight is determined. By this method conventional foam rubber will return from about 85% to 100%, polyether urethane foams about 60% to 90%, polyester urethane foams about 50% to 70%, and high hysteresis urethane foams of the type utilized herein about 5% to 20%. A foam mattress formed by laminating by the method described herein will have a composite recovery of about 30% to 60%, thus illustrating the retarding effect of the slow recovery material while retaining the advantageous characteristics of the rapid recovery surface layers.

Since foam rubber is the most resilient of conventional foams used for cushioning purposes, it may be taken as the standard. If foam rubber is considered as 100, the other foam materials referred to may be rated as to rate of recovery or resilience by allocating to polyether urethane foams a range of 60 to 90, to polyester urethane foams a range of 50 to 70 and to high hysteresis foams a range of 10 to 20, these values representing preferred types of materials for assembly into the composite products described. In general, the more resilient formulations for each type of foam are preferred. Based on applicant's experimental data, the high hysteresis foam used will have a resilience ranging from 10% to 40% of low hysteresis foams used therewith, the thickness of the foam layers and their individual characteristics determining the resilience of the final product.

Figure 3:
FIG. 3 is a transverse cross sectional view corresponding to that shown in FIG. 2, but illustrating the effect of the application of a load to the mattress.
Figure 4:
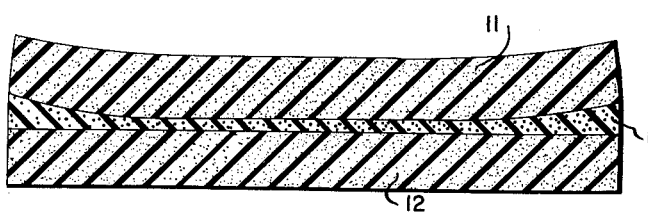
FIG. 4 is a view similar to that shown in FIG. 3, except that the structure which results shortly after removal of the load is illustrated.

As illustrated in FIGURE 3, the application of a load, such as a human body in sitting or reclining position, will depress layer 11 and cause compression of high hysteresis layer 13. Upon the release of said load, as by moving or removing the body, layer 11 will recover almost instantaneously while layer 13 will recover only slowly, thus tending to restrain the top layer from full recovery as shown in FIGURE 4.

We claim:

1. A cushioning construction for mattresses and the like comprising top and bottom layers of low hysteresis-high resiliency foamed material having 50-100% the recovery rate of foam rubber and an intermediate layer consisting of high hysteresis-low resiliency foamed urethane polymer having 5-20% the recovery rate of foam rubber; said foam rubber having a Yerzley resiliency of 50-75%.

2. A cushioning construction according to claim 1 wherein the top, bottom and intermediate layers have a composite recovery rate of 30-60% that of foam rubber.

3. A cushioning construction according to claim 1 wherein the top and bottom layers are urethane foams having 50-90% recovery rate of foam rubber.

4. A cushioning construction according to claim 3 wherein the urethane foam is of the polyether type having 60-90% the recovery rate of foam rubber.

5. A cushioning construction according to claim 3 wherein the urethane foam is of the polyester type having 50-70% the recovery rate of foam rubber.

6. A cushioning construction according to claim 1 wherein the top and bottom layers are each about 2 inches thick and the intermediate layer is about ¾ inch thick.

7. A cushioning construction for mattresses and the like comprising top and bottom layers of low hysteresis-high resiliency-high recovery rate foamed material, and an intermediate layer consisting of a high hysteresis-low resiliency-low recovery rate castor oil modified foamed urethane polymer.

8. A cushioning construction for mattresses and the like comprising top and bottom layers of low hysteresis-high resiliency-high recovery rate castor oil modified foamed urethane polymer, and an intermediate layer consisting of a high hysteresis-low resiliency-low recovery rate castor oil modified foamed urethane polymer.

9. A cushioning construction for mattresses and the like comprising top and bottom layers of low hysteresis-high resiliency-high recovery rate foamed material and an intermediate layer consisting of high hysteresis-low resiliency foamed urethane polymer having 5–20% the recovery rate of foam rubber, said foam rubber having a Yerzley resiliency of 50–75%.

References Cited in the file of this patent

UNITED STATES PATENTS

| | | |
|---|---|---|
| 2,878,153 | Hacklander | Mar. 17, 1959 |
| 2,955,091 | Kane | Oct. 4, 1960 |

FOREIGN PATENTS

| | | |
|---|---|---|
| 748,990 | Great Britain | May 16, 1956 |